United States Patent [19]

Shelquist et al.

[11] 4,078,822
[45] Mar. 14, 1978

[54] TONGUE CONSTRUCTION FOR TRAILERS

[75] Inventors: James A. Shelquist, Kansas City; Ronald A. Poage, Springfield, both of Mo.

[73] Assignee: American Samax Co., Kansas City, Mo.

[21] Appl. No.: 673,901

[22] Filed: Apr. 5, 1976

[51] Int. Cl.² ............................................. B60D 1/14
[52] U.S. Cl. ................................... 280/489; 298/8 T
[58] Field of Search ............... 280/489, 461 R, 405 R, 280/406 R, 406 A; 298/8 T, 8 R

[56] References Cited

U.S. PATENT DOCUMENTS

| | | | |
|---|---|---|---|
| 2,142,749 | 1/1939 | Graves | 280/489 X |
| 2,309,766 | 2/1943 | Harroun et al. | 280/489 X |
| 2,452,710 | 11/1948 | Allen | 280/489 |
| 2,872,208 | 2/1959 | Bennett | 280/489 X |
| 3,193,329 | 7/1965 | Hribar | 298/8 R |

Primary Examiner—Joseph F. Peters, Jr.
Assistant Examiner—John A. Pekar
Attorney, Agent, or Firm—Lowe, Kokjer, Kircher, Wharton & Bowman

[57] ABSTRACT

The present invention relates to a novel trailer tongue assembly and a method of mounting a tongue frame on a trailer vehicle. A generally V-shaped tongue frame is pivotally coupled with the trailer vehicle at a point located below the trailer main frame and substantially co-planar with the supporting wheel and axle assembly. An elongated strut member is rigidly coupled with the tongue frame and extends toward the trailer vehicle along a vertical plane bisecting the two legs of the tongue frame. A leaf spring is coupled with the strut member and in turn is coupled with the trailer vehicle. The leaf spring is disposed so that its major plane of flexure will be perpendicular to the plane of the tongue frame.

5 Claims, 7 Drawing Figures

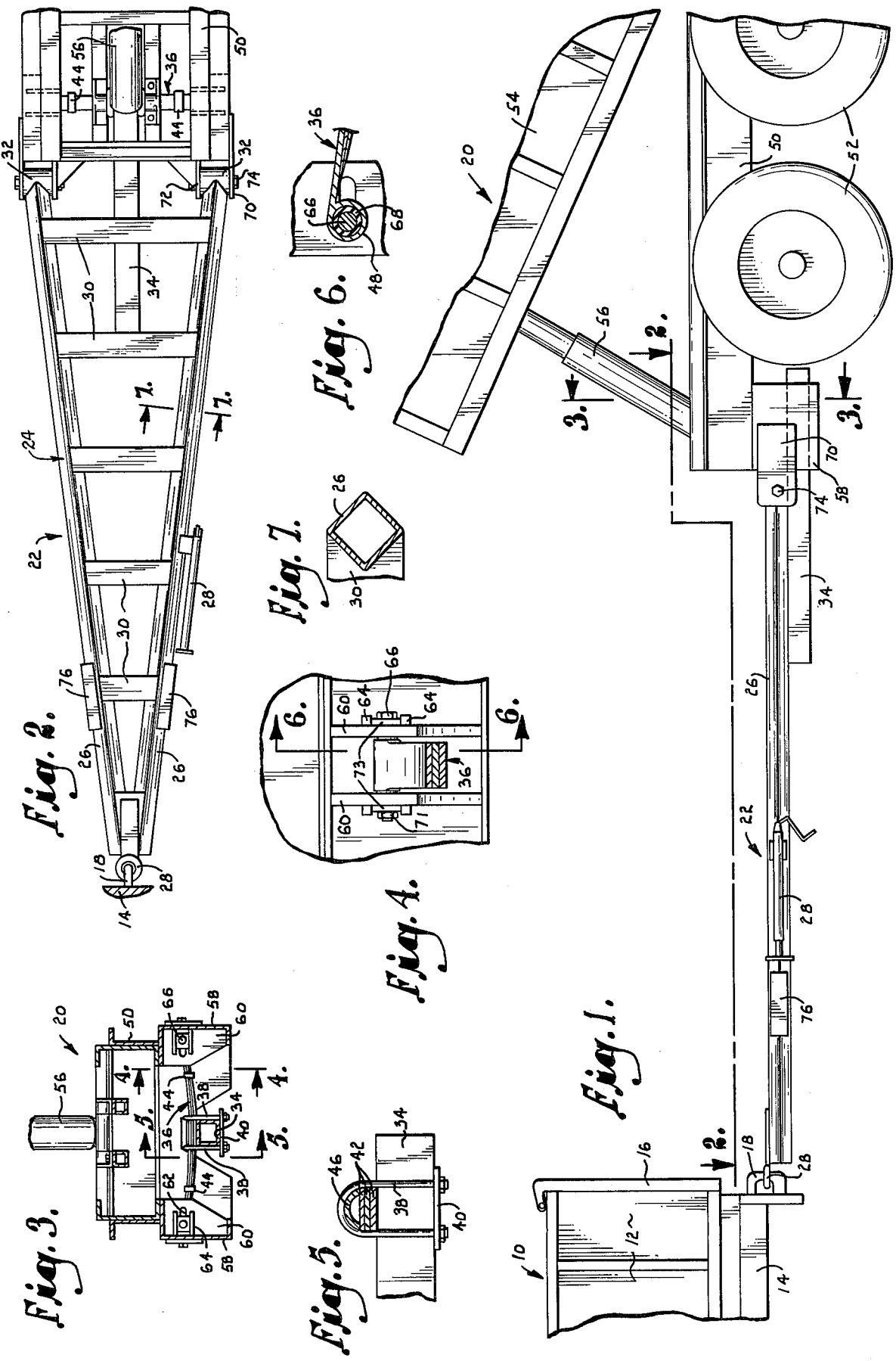

TONGUE CONSTRUCTION FOR TRAILERS

This invention relates to trailer construction generally and, more particularly, to a novel tongue assembly for a trailer and a method of mounting a tongue assembly on a trailer.

In recent years so-called "pup trailers" have become a popular means of increasing the payload hauled by a single truck utilizing a single driver. A large truck, such as a dump truck, normally has sufficient power to carry a payload in excess of the capacity of the main carrying bed of the vehicle. While it is obviously more economical to utilize a single vehicle and a single driver to operate a loaded vehicle plus a trailer over the cost of operating two vehicles, the solution is complicated by highway user laws. These laws require a certain minimum distance between the axles of a towed and towing vehicle for a given amount of load. With many types of vehicles, a short bed on the vehicle itself is desired thus necessitating a long tongue between the vehicle and a towed trailer which is also loaded.

The existence of a relatively long tongue frame which must be able to withstand substantial loading and stresses from different directions causes design problems. One attempt to overcome the problems in presenting a high strength long towing tongue frame is shown in Hribar U.S. Pat. Nos. 3,193,329 and 3,193,330. The tongue frame shown in these patents is a tripod member utilizing a coil spring interposed between the trailer and the lowest-most leg of the tripod for purposes of accommodating a degree of flex in the tongue frame. While the Hribar tongue frame represents some improvement over rigid tongue frames, difficulties have been noticed in conjunction with the Hribar construction.

One of the difficulties is the fact that the tripod arrangement requires that the entire tongue frame be raised relatively high above the plane of the trailer axles so as to provide adequate clearance for the lowest-most leg of the tongue frame. This causes the center of gravity of the load which is transferred to the towing vehicle to be relatively high causing a certain inherent amount of instability. Another difficulty with the tongue frame construction discussed above is that the relatively high position of it is likely to cause interference with a dump bed tailgate on the towing vehicle.

It has also been found that when a tripod tongue frame arrangement of the type discussed above is utilized the coil spring interposed between the lowermost leg of the tripod and the trailer vehicle tends to weaken over a period of time. This is at least partially attributable to the fact that the particular disposition of the spring causes it to flex or be compressed upon the slightest force exerted by the towing vehicle upon the trailer, including starting and stopping. Another disadvantage of the tripod tongue frame construction discussed above is that the relatively high plane of the draw force and the fact that this force is being exerted from two distal locations may cause a tendency for the trailer to tip either forward or backward. This places additional stresses on the trailer main frame.

It is, therefore, an object of the present invention to provide a trailer construction utilizing a tongue frame which will be disposed in a relatively low horizontal plane to provide better utilization of power, increased stability, and eliminate any interference with a dump bed or the like on the towing vehicle.

Another object of this invention is to provide a tongue frame for a trailer which utilizes less material than previously known tripod tongue frames, thereby reducing the cost and lowering the weight.

An important aim of this invention is also to provide a tongue frame which may flex to a certain degree either upwardly or downwardly without damaging either the tongue frame or the trailer main frame.

As a corollary to the above object, an important aim of the invention is to provide a tongue frame utilizing spring means for accommodating a degree of flexure of the frame and wherein the plane of major flexure of the spring is perpendicular to the plane of draw on the trailer, thereby decreasing the frequency and amount of flexure of the spring during relatively minor movements of either the trailer or the towing vehicle.

Another important aim of this invention is to utilize structural members for a trailer tongue frame which will provide for increased strength of the frame by orienting the members to place the strongest portions where maximum stresses are encountered, thus better utilizing the strength of the material without substantially increasing cost.

Still another objective of this invention is to provide a method of mounting a tongue frame to a trailer whereby some movement of the tongue frame is permitted without stressing the spring which accommodates the movement to such an extent as to cause excessive fatigue and loss of memory.

Other objects of the invention will be made clear or become apparent from the following description and claims when read in light of the accompanying drawing, wherein:

FIG. 1 is an elevational view of the tongue frame construction of the present invention shown in coupling relationship with a towing vehicle and a towed trailer;

FIG. 2 is a top plan view looking in the direction of arrows 2—2 of FIG. 1;

FIG. 3 is a vertical sectional view taken along line 3—3 of FIG. 1;

FIG. 4 is a vertical section, on an enlarged scale, taken along line 4—4 of FIG. 3;

FIG. 5 is a vertical section, on an enlarged scale, taken along line 5—5 of FIG. 3;

FIG. 6 is a vertical cross-sectional view, taken along line 6—6 of FIG. 4; and

FIG. 7 is an enlarged vertical cross-sectional view taken along line 7—7 of FIG. 2;

Referring initially to FIG. 1, a towing vehicle is represented generally by the numeral 10 and is seen only fragmentarily with the rear portion of a dump bed 12 being mounted on the chassis 14. A hinged tailgate 16 is provided for unloading dump bed 12. A pintle hook assembly 18 is also secured to chassis 14 to present a trailer hitch at the rear of vehicle 10.

A trailer of the type commonly referred to as a "pup trailer" is designated generally by the numeral 20 and is coupled with vehicle 10 through a tongue assembly designated generally by the numeral 22. Referring additionally to FIG. 2, it is seen that tongue assembly 22 comprises a generally V-shaped framework 24 having two diverging leg members 26, each of generally diamond shaped cross section when viewed in a horizontal plane, as illustrated in FIG. 7. An eyelet hitch 28 is rigid with both leg members 26 at the point of greatest convergence of the leg members. Extending transversely of the leg members and rigid with both of them is a truss arrangement comprising a plurality of parallel equispaced truss components 30. Manifestly, truss components 30 are of increasing length as they span the distance between the diverging leg members. Each of the leg members 26 terminates in a rigid sleeve 32 for pivotal coupling with trailer 20.

Rigid with the rearwardmost two truss components 30 and extending transversely thereof in a plane which bisects the two leg members 26 at their point of convergence is a longitudinally extending strut 34. Strut 34 is rigid with components 30 and lies parallel to tongue frame 26 in a plane lying closely adjacent to the plane of the leg members. Strut 34 extends rearwardly passed the terminal point of legs 26 and passed the leading edge of trailer 20.

As best illustrated in FIGS. 3-5, the end of strut 34 which extends across the perimeter of trailer 20 is provided with a leaf spring 36 along its uppermost planar surface. It will be appreciated that the generally rectangular box-like configuration of strut 34, as seen in FIG. 3, provides a relatively wide surface area for contact between the strut and the spring and also facilitates securing the spring to the strut through the use of U bolts 38 and plate 40. Leaf spring 36 is comprised of three planar leaf elements 42 disposed in sandwiched relationship and held together by clamps 44. A convex retaining plate 46 spans the distance between U bolts 38 and underlies the concave bight portion of each of the bolts to help retain spring 36. As best illustrated in FIG. 6, each end of leaf spring 36 terminates in an eyelet 48 which is used to secure the spring to trailer 20 as described in greater detail hereinafter.

Trailer 20 comprises a main framework 50 which is supported upon wheel and axle assemblies 52. A dump bed 54 is mounted on framework 50 and is raised and lowered by a hydraulic cylinder 56.

Welded or otherwise rigidly secured to frame 50 in depending relationship are opposed bracket members 58. The two bracket members face each other on opposite sides of framework 50 and each is reinforced by transversely extending gusset plates 60. As best illustrated in FIG. 4, there are two gusset plates 60 for each of the brackets 58 and each plate is provided with a transverse slot 62. Each slot 62 is bordered on opposite sides by retaining tracks 64. A bolt 66 is received in eyelet 48 which also receives a rubber bushing 68. The head of bolt 66 projects on one side of one of the gussets 60 and a retaining nut 71 is disposed on the other end of the nut. Two resilient mounting pads 73 are disposed between gusset plates 60 and the bolt head and nut, respectively.

Also mounted on brackets 58 are forwardly extending spaced parallel arms 70 and 72 (FIG. 2) which receive sleeves 32 and pivotally mount leg members 26 by means of nut and bolt assemblies 74. It is desirable to provide resilient bushings inside of sleeves 32 in a manner analogous to mounting of the leaf spring 36.

In use, trailer 20 carries a load comparable to the load in the bed 12 of towing vehicle 10. It is to be understood that the utilization of dump beds is merely illustrative and many types of utility beds, tank beds, and other load carrying embodiments may utilize the principles of the present invention.

The long tongue assembly 22 provides the legally required distance between the load carrying axles of the truck and pup trailer. If the tongue assembly was made rigid with the trailer, considerable stresses would be imparted to both the tongue and the trailer frame as the trailer passes over rough terrain and is subjected to twisting and turning forces particularly when loaded. Thus, the tongue assembly 22 is not rigid with trailer 20 but instead is pivotally coupled therewith by utilization of sleeves 32 and the corresponding sleeve receiving arms 72 and 74. This arrangement permits a degree of flexure of framework 24 as trailer 20 passes over uneven terrain. Framework 24 is permitted to flex either upwardly or downwardly by virtue of its pivotal coupling with the trailer main frame and the utilization of leaf spring 36. The presence of leaf spring 36 will, of course, tend to always return the framework to its normal horizontal disposition thereby assuring stability. By locating strut 34 in the same horizontal plane as the plane of the axle members of assemblies 52, and by placing framework 24 in contiguous relationship to strut 34, the plane of the overall tongue assembly 22 is closely spaced to the plane of the axle members. This provides for a straight through pull between the towing vehicle 10 and trailer 20 thereby making superior utilization of power while also lowering the center of gravity and improving balance. There is no tendency to tip trailer 20 when it is either pulled forward or pushed backward since the plane of draw is substantially co-planar with the plane of the trailer supporting axles. There is also adequate room between the framework 24 and the bottom of tailgate 16 to allow for clearance of the latter when the vehicle bed 12 is raised into a dumping position.

Another advantage of the construction of tongue framework 24 is that the greatest stress forces against the tongue are in horizontal and vertical planes. By virtue of the fact that each of the leg members 26 is turned to present 90° angles in both its vertical and horizontal bisecting planes, the maximum strength possible for a particular thickness of material is obtained. In this regard, it is noted that in some instances a driver of the towing vehicle may turn the latter too sharply causing the rear wheels (not shown) to engage framework 24. The fact that each of the tongue members 26 presents a 90° angle in its horizontal plane at the point where the wheels would contact the frame gives added strength to resist bending from contact by the vehicle. In this regard a contact plate 76 is disposed on the outside of each leg 26 to prevent the tires from the towing vehicle from climbing up on the tongue frame. A jack 78 disposed adjacent one of the contact plates provides means for supporting the tongue frame when it is freed from the towing vehicle and also allows a single operator to hitch and unhitch the trailer.

By virtue of using a leaf type spring and having this spring disposed with its major plane of flexure in transverse relationship to the plane of draw through tongue frame 24, the amount of flexing of the spring is minimized. Thus, wear on the spring is reduced and potential damage to the spring from simple starting and stopping of the towing vehicle is substantially eliminated. On the other hand, when the trailer 20 is towed over uneven roads and terrain where a certain degree of flexing of the tongue assembly 22 is desired to prevent damage to framework 24 as well as trailer 20, this is possible as a result of the non-rigid coupling of the framework with the trailer. The bending forces acting on the framework 24 are transmitted through strut 34 to spring 36 which is free to flex both up and down in a vertical plane thereby dissiminating the forces which would otherwise tend to stress both the tongue assembly and the trailer.

Having thus described the invention we claim:
1. Trailer construction comprising:
a trailer framework for supporting a trailer bed;

a generally planar V-shaped tongue frame coupled with said framework at the forwardmost end of the latter, said tongue frame terminating in means for coupling said frame with a towing vehicle, said tongue frame being adapted to lie in a horizontal plane during normal pulling of said trailer;

strut means rigidly coupled with said tongue frame at the end of the latter which is coupled with said trailer framework, said strut means lying in a plane which bisects the tongue frame at a point between the two legs of the V and extending along the line of draft in the direction of said trailer framework past the point of coupling of said tongue frame with said framework; and leaf spring means extending laterally of said strut means and coupled with said framework at opposite ends of said spring means, said spring means being further coupled with said strut means at a location approximately midway along the length of said spring means, whereby a draft force acting on said tongue frame when the latter is disposed in a horizontal plane will not result in flexure of said spring means while movement of said tongue frame out of a horizontal plane will result in flexure of the spring means.

2. The invention of claim 1, wherein is included truss means extending between the legs of said tongue frame in overlying relationship to said strut means, said truss means being rigidly coupled with the legs of said tongue frame and with said strut means.

3. The invention of claim 1, wherein said spring means is disposed so that its plane of major flexure is perpendicular to the plane of said tongue frame.

4. The invention of claim 3, there being at least one axle and wheel assembly supporting said trailer framework, and wherein said tongue frame lies in a plane below the plane of said trailer framework and in closely spaced relationship to the plane of the said axle and wheel assembly.

5. The invention of claim 4, wherein is provided resilient means for effecting coupling of said leaf spring means with said trailer framework.

* * * * *